(12) United States Patent
Zheng et al.

(10) Patent No.: US 9,805,240 B1
(45) Date of Patent: Oct. 31, 2017

(54) BARCODE SCANNING AND DIMENSIONING

(71) Applicant: SYMBOL TECHNOLOGIES, LLC, Lincolnshire, IL (US)

(72) Inventors: Hao Zheng, Centereach, NY (US); David S. Koch, East Islip, NY (US); Zhiheng Jia, Plantation, FL (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/131,856

(22) Filed: Apr. 18, 2016

(51) Int. Cl.
 *G06K 7/10* (2006.01)
 *G06K 7/14* (2006.01)
 *H04N 5/33* (2006.01)
 *G06K 19/06* (2006.01)

(52) U.S. Cl.
 CPC ....... *G06K 7/1447* (2013.01); *G06K 7/10722* (2013.01); *G06K 7/1417* (2013.01); *G06K 19/06037* (2013.01); *H04N 5/33* (2013.01)

(58) Field of Classification Search
 CPC ............ G06K 7/1447; G06K 7/10722; G06K 7/1417; G06K 19/06037; G06K 7/14; G06K 7/10881; G06K 7/10851; H04N 5/33
 USPC .................. 235/462.09, 462.1, 462.11, 462.2
 See application file for complete search history.

(56) References Cited

U.S. PATENT DOCUMENTS

| | | | |
|---|---|---|---|
| 5,408,322 A | 4/1995 | Hsu et al. | |
| 5,988,862 A | 11/1999 | Kacyra et al. | |
| 6,115,114 A | 9/2000 | Berg et al. | |
| 7,137,207 B2 | 11/2006 | Armstrong et al. | |
| 7,248,754 B2 | 7/2007 | Cato | |
| 7,373,722 B2 | 5/2008 | Cooper et al. | |
| 7,487,595 B2 | 2/2009 | Armstrong et al. | |
| 7,527,205 B2 | 5/2009 | Zhu et al. | |
| 7,605,817 B2 | 10/2009 | Zhang et al. | |
| 7,647,752 B2 | 1/2010 | Magnell | |
| 7,726,575 B2 | 6/2010 | Wang et al. | |
| 8,132,728 B2 | 3/2012 | Dwinell et al. | |
| 8,134,717 B2 | 3/2012 | Pangrazio et al. | |
| 8,199,977 B2 | 6/2012 | Krishnaswamy et al. | |
| 8,265,895 B2 | 9/2012 | Willins et al. | |

(Continued)

FOREIGN PATENT DOCUMENTS

| | | |
|---|---|---|
| CA | 2835830 A1 | 11/2012 |
| CN | 104200086 A | 12/2014 |

(Continued)

OTHER PUBLICATIONS

International Search Report and Written Opinion for related International Patent Application No. PCT/US2015/055982 mailed on Jan. 4, 2016.

(Continued)

*Primary Examiner* — Karl D Frech (57) ABSTRACT

Implementations relate to a device and method for barcode scanning and dimensioning. In some implementations, the method includes acquiring a two-dimensional (2D) preview image of an object, and processing the 2D preview image to determine one or more dark areas and to determine a location of a code on the object. The method also includes acquiring a three-dimensional (3D) image of the object based on the one or more dark areas, and processing the 3D image to determine depth data and to determine dimensions of the object. The method also includes acquiring a 2D data capture image of the object based on the depth data in the processed 3D image, where the 2D data capture image captures the code. The method also includes reading the code based on the 2D data capture image.

19 Claims, 7 Drawing Sheets

(56) References Cited

U.S. PATENT DOCUMENTS

| | | | |
|---|---|---|---|
| 8,284,988 B2 | 10/2012 | Sones et al. | |
| 8,463,079 B2 | 6/2013 | Ackley et al. | |
| 8,479,996 B2 | 7/2013 | Barkan et al. | |
| 8,542,252 B2 | 9/2013 | Perez et al. | |
| 8,599,303 B2 | 12/2013 | Stettner | |
| 8,660,338 B2 | 2/2014 | Ma et al. | |
| 8,757,479 B2 | 6/2014 | Clark et al. | |
| 9,070,285 B1 | 6/2015 | Ramu | |
| 9,396,554 B2 | 7/2016 | Williams et al. | |
| 9,600,892 B2 | 3/2017 | Patel et al. | |
| 2001/0041948 A1 | 11/2001 | Ross et al. | |
| 2005/0016004 A1 | 1/2005 | Armstrong et al. | |
| 2005/0114059 A1 | 5/2005 | Chang et al. | |
| 2007/0074410 A1 | 4/2007 | Armstrong et al. | |
| 2007/0272732 A1 | 11/2007 | Hindmon | |
| 2008/0238919 A1 | 10/2008 | Pack | |
| 2009/0103773 A1 | 4/2009 | Wheeler et al. | |
| 2009/0152391 A1 | 6/2009 | McWhirk | |
| 2009/0323121 A1 | 12/2009 | Valkenburg et al. | |
| 2010/0118116 A1 | 5/2010 | Tomasz | |
| 2010/0295850 A1 | 11/2010 | Katz | |
| 2010/0315412 A1 | 12/2010 | Sinha et al. | |
| 2011/0052043 A1 | 3/2011 | Hung | |
| 2011/0137527 A1 | 6/2011 | Simon et al. | |
| 2011/0168774 A1* | 7/2011 | Magal | G06K 7/10 235/375 |
| 2011/0216063 A1 | 9/2011 | Hayes | |
| 2011/0310088 A1 | 12/2011 | Adabala et al. | |
| 2012/0075342 A1 | 3/2012 | Choubassi et al. | |
| 2012/0209553 A1 | 8/2012 | Doytchinov et al. | |
| 2012/0236119 A1 | 9/2012 | Rhee | |
| 2012/0250978 A1 | 10/2012 | Taylor | |
| 2013/0144565 A1 | 6/2013 | Miller | |
| 2013/0156292 A1 | 6/2013 | Chang et al. | |
| 2013/0162806 A1 | 6/2013 | Ding et al. | |
| 2013/0228620 A1 | 9/2013 | Ahern et al. | |
| 2013/0236089 A1 | 9/2013 | Litvak et al. | |
| 2013/0299306 A1 | 11/2013 | Jiang et al. | |
| 2013/0321418 A1 | 12/2013 | Kirk | |
| 2013/0329013 A1 | 12/2013 | Metois et al. | |
| 2014/0002597 A1 | 1/2014 | Taguchi | |
| 2014/0028837 A1 | 1/2014 | Gao et al. | |
| 2014/0049616 A1 | 2/2014 | Stettner | |
| 2014/0098094 A1 | 4/2014 | Neumann | |
| 2014/0100813 A1 | 4/2014 | Showering | |
| 2014/0104413 A1 | 4/2014 | McCloskey et al. | |
| 2014/0192050 A1 | 7/2014 | Qiu | |
| 2014/0267614 A1 | 9/2014 | Ding et al. | |
| 2014/0351073 A1 | 11/2014 | Murphy et al. | |
| 2015/0015602 A1 | 1/2015 | Beaudoin | |
| 2015/0092066 A1 | 4/2015 | Geiss et al. | |
| 2015/0154467 A1 | 6/2015 | Feng | |
| 2015/0181198 A1 | 6/2015 | Baele et al. | |
| 2015/0379704 A1 | 12/2015 | Chandrasekar et al. | |
| 2016/0012588 A1 | 4/2016 | Taguchi | |
| 2016/0163067 A1 | 7/2016 | Williams | |
| 2017/0219338 A1 | 8/2017 | Brown et al. | |
| 2017/0227645 A1 | 8/2017 | Swope et al. | |

FOREIGN PATENT DOCUMENTS

| | | |
|---|---|---|
| EP | 2439487 A1 | 4/2012 |
| EP | 2562688 A2 | 2/2013 |
| EP | 2693362 A1 | 2/2014 |
| WO | 03/002935 A1 | 1/2003 |
| WO | 2008154611 A2 | 12/2008 |
| WO | 2013/165674 | 11/2013 |
| WO | 2015/127503 A1 | 9/2015 |

OTHER PUBLICATIONS

"Fair Billing with Automatic Dimensioning" pp. 1-4, undated, Copyright Mettler-Toledo International Inc.

"Swift Dimension" Trademark Omniplanar, undated.

"Plane Detection in Point Cloud Data" dated Jan. 25, 2010 by Michael Ying Yang and Wolfgang Forstner, Technical Report 1, 2010, University of Bonn.

International Search Report and Written Opinion for International Patent Application No. PCT/US2017/024847 dated Jul. 7, 2017.

Schnabel et al. "Efficient RANSAC for Point-Cloud Shape Detection", vol. 0, No. 0, pp. 1-12.

Buenaposada et al. "Real-time tracking and estimation of plane pose" Proceedings of the ICPR (Aug. 2002) vol. II, IEEE pp. 697-700.

Fu et al., U.S. Appl. No. 15/385,113, filed Dec. 20, 2016.

Brown et al., U.S. Appl. No. 15/078,074, filed Mar. 23, 2016.

Zheng et al., U.S. Appl. No. 15/131,856, filed Apr. 18, 2016.

Lecking et al., "Localization in a wide range of industrial environments using relative 3D ceiling features," IEEE, pp. 333-337, Sep. 15, 2008.

Carreira et al., "Enhanced PCA-based localization using depth maps with missing data," IEEE, pp. 1-8, Apr. 24, 2013.

Clayton et al., U.S. Appl. No. 15/358,810, filed Nov. 22, 2016.

F.C.A. Groen et al., "The smallest box around a package," Pattern Recognition, vol. 14, No. 1-6, Jan. 1, 1981, pp. 173-176, XP055237156, GB, ISSN: 0031-3203, DOI: 10.1016/0031-3203(81(90059-5 p. 176-p. 178.

Ziang Xie et al., "Multimodal Blending for High-Accuracy Instance Recognition", 2013 IEEE/RSJ International Conference on Intelligent Robots and Systems, pp. 2214-2221.

N.D.F. Campbell et al. "Automatic 3D Object Segmentation in Multiple Views using Volumetric Graph-Cuts", Journal of Image and Vision Computing, vol. 28, Issue 1, Jan. 2010.

Federico Tombari et al. "Multimodal cue integration through Hypotheses Verification for RGB-D object recognition and GDOF pose estimation", IEEE International Conference on Robotics and Automation, Jan. 2013.

Ajmal S. Mian et al., "Three-Dimensional Model Based Object Recognition and Segmentation in Cluttered Scenes", IEEE Transactions on Pattern Analysis and Machine Intelligence, vol. 28, No. 10, Oct. 2006.

Gu et al., U.S. Appl. No. 15/242,126, filed Aug. 19, 2016.

Dubois, M., et al., "A comparison of geometric and energy-based point cloud semantic segmentation methods," European Conference on Mobile Robots (ECMR), vol., No., pp. 88-93, Sep. 25-27, 2013.

Lari, Z., et al., "An adaptive approach for segmentation of 3D laser point cloud." International Archives of the Photogrammetry, Remote Sensing and Spatial Information Sciences, vol. XXXVIII-5/W12, 2011, ISPRS Calgary 2011 Workshop, Aug. 29-31 2011, Calgary, Canada.

Rusu, et al. "Spatial change detection on unorganized point cloud data," PCL Library, retrieved from Internet on Aug. 19, 2016 [http://pointclouds.org/documentationitutorialsioctree_change.php].

Rabbani, T., et al., "Segmentation of point clouds using smoothness constraint," International Archives of Photogrammetry, Remote Sensing and Spatial Information Sciences 36.5 (Sep. 2006): 248-253.

Golovinskiy, Aleksey, et al. "Min-cut based segmentation of point clouds." Computer Vision Workshops (ICCV Norkshops), 2009 IEEE 12th International Conference on. IEEE, 2009.

Douillard, Bertrand, et al. "On the segmentation of 3D LIDAR point clouds." Robotics and Automation (ICRA), 2011 IEEE International Conference on. IEEE, 2011.

Puwein, J., et al., "Robust multi-view camera calibration for wide-baseline camera networks," in IEEE Workshop on Applications of Computer Vision (WACV), Jan. 2011.

Datta, A., et al., "Accurate camera calibration using iterative refinement of control points," in Computer Vision Vorkshops (ICCV Workshops), 2009.

Olson, Clark F., et al. "Wide-Baseline Stereo Vision for Terrain Mapping" in Machine Vision and Applications, Aug. 2010.

(56) References Cited

OTHER PUBLICATIONS

Rusu, et al., "How to incrementally register pairs of clouds," PCL Library, retrieved from the Internet on Aug. 22, 2016 from <http://pointclouds.org/documentationitutorials/pairwise_incremental_registration.php>.

* cited by examiner

BARCODE SCANNING AND DIMENSIONING

BACKGROUND

Accurate measurement of packages prior to shipping is an important task in the transportation and logistics industry. Dimension measurements and weight measurements are common measurements prior to shipping a package. Another common task prior to shipping is the scanning of barcodes. Barcode scanning is generally accomplished using imaging scanners, where an imaging scanner takes a picture of the entire barcode, and a processor running image-processing algorithms recognizes and decodes the barcode. Barcode scanning is often implemented on a mobile device.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate implementations of concepts described herein, and explain various principles and advantages of those implementations.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations of the present specification.

The apparatus and method components have been represented where appropriate by conventional symbols in the drawings, showing only those specific details that are pertinent to understanding the implementations of the present specification so as not to obscure the disclosure with details that will be readily apparent to those of ordinary skill in the art having the benefit of the description herein.

DETAILED DESCRIPTION

An aspect of the specification provides a method that includes acquiring a two-dimensional (2D) preview image of an object, where the 2D preview image is obtained from a 2D camera device. The method also includes processing the 2D preview image to determine a location of a code on the object. As described in more detail herein, the code may be a barcode. The method also includes acquiring a three-dimensional (3D) image of the object, where the 3D image is obtained from a 3D camera device. The method also includes processing the 3D image to determine depth data. The method also includes acquiring a 2D data capture image of the object based on the depth data in the processed 3D image, where the 2D data capture image captures the code, and where the 2D data capture image is obtained from the 2D camera device. The method also includes reading the code based on the 2D data capture image.

In some implementations, the 3D camera device may be an infrared camera device. In some implementations, the method may further include focusing a lens of the 2D camera device on the code based on the depth data in the processed 3D image. In some implementations, the method may further include providing an indicator to a user, where the indicator guides the user to optimally position the 2D camera device relative to the object based on the depth data in the processed 3D image. In some implementations, the method may further include adjusting a resolution of the code based on the depth data in the processed 3D image. In some implementations, the code may be a barcode. In some implementations, the method may further include cropping an image of the code when the depth data in the processed 3D image exceeds a predetermined depth threshold.

In some implementations, another aspect of the specification provides a system that includes a 2D camera device, a 3D camera device, and one or more processors. The system also includes data storage containing instructions executable by the one or more processors. The instructions cause the system to perform operations which may include acquiring a 2D preview image of an object obtained from a 2D camera device, processing the 2D preview image to determine a location of a code on the object, and acquiring a 3D image of the object, where the 3D image is obtained from a 3D camera device. The instructions may also include processing the 3D image to determine depth data, acquiring a 2D data capture image of the object based on the depth data in the processed 3D image, where the 2D data capture image captures the code and where the 2D data capture image is obtained from the 2D camera device, and reading the code based on the 2D data capture image.

In some implementations, another aspect of the specification provides a method that includes acquiring a 2D preview image of an object obtained from a 2D camera device, processing the 2D preview image to determine one or more dark areas, acquiring a 3D image of the object based on the one or more dark areas in the processed 2D preview image, where the 3D image is obtained from a 3D camera device, and processing the 3D image to determine dimensions of the object.

In some implementations, the 3D camera device may be an infrared camera device. In some implementations, the method may further include displaying the dimensions of the object on a display device. In some implementations, the method may further include displaying the 2D data capture image of the object on a display device. In some implementations, the method may further include adjusting at least one of an exposure time of the 3D image and the gain of the 3D image based on the one or more dark areas in the processed 2D preview image. In some implementations, the processing of the 3D image may include identifying one or more surfaces of the object, determining a region of interest based on the one or more surfaces, and adjusting an exposure time of the 3D image and/or the gain of the 3D image based on the processed 2D preview image. In some implementations, the processing of the 3D image may include, identifying surfaces of the object, and determining dimensions of the object based on the identified surfaces of the object.

In some implementations, another aspect of the specification provides a system that includes a 2D camera device, a 3D camera device, one or more processors, and data storage containing instructions. The instructions are executable by the one or more processors for causing the system to perform operations including acquiring a 2D preview image of an object, where the 2D preview image is obtained from a 2D camera device. The operations also include processing the 2D preview image to determine one or more dark areas. The operations also include acquiring a 3D image of the object based on the one or more dark areas in the processed 2D preview image, where the 3D image is obtained from a 3D camera device. The operations also include processing the 3D image to determine dimensions of the object.

In some implementations, another aspect of the specification provides a method that includes acquiring a 2D preview image of an object obtained from a 2D camera device. The method further includes processing the 2D preview image to determine one or more dark areas and to determine a location of a code on the object. The method also includes acquiring a 3D image of the object based on the one or more dark areas, where the 3D image is obtained from a 3D camera device. The method also includes processing the 3D image to determine depth data and to determine dimensions of the object. The method also includes acquiring a 2D data capture image of the object based on the depth data in the processed 3D image, where the 2D data capture image captures the code, and where the 2D data capture image is obtained from the 2D camera device. The method also includes reading the code based on the 2D data capture image.

Figure 1:
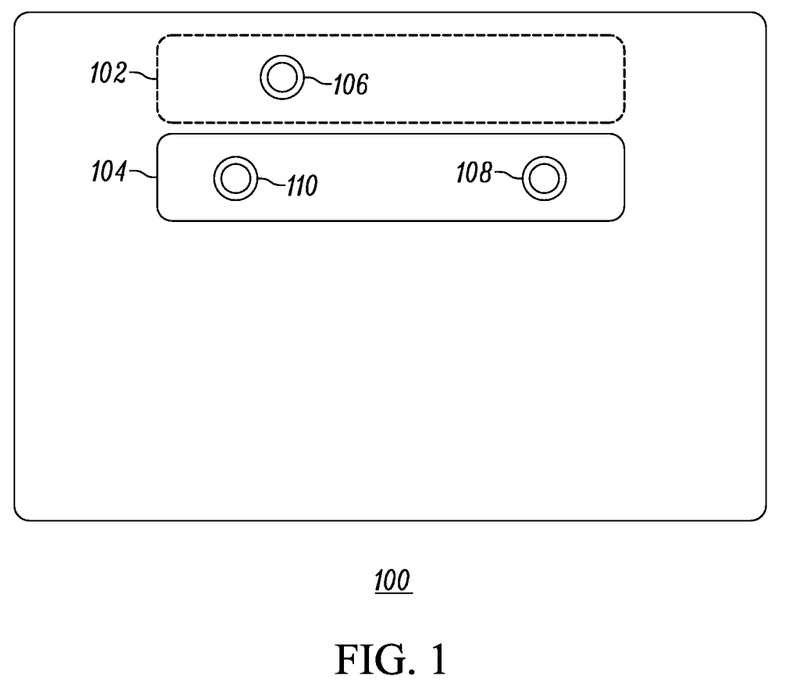
FIG. 1 depicts an example device for dimensioning and barcode scanning, in accordance with some implementations.
Figure 2:
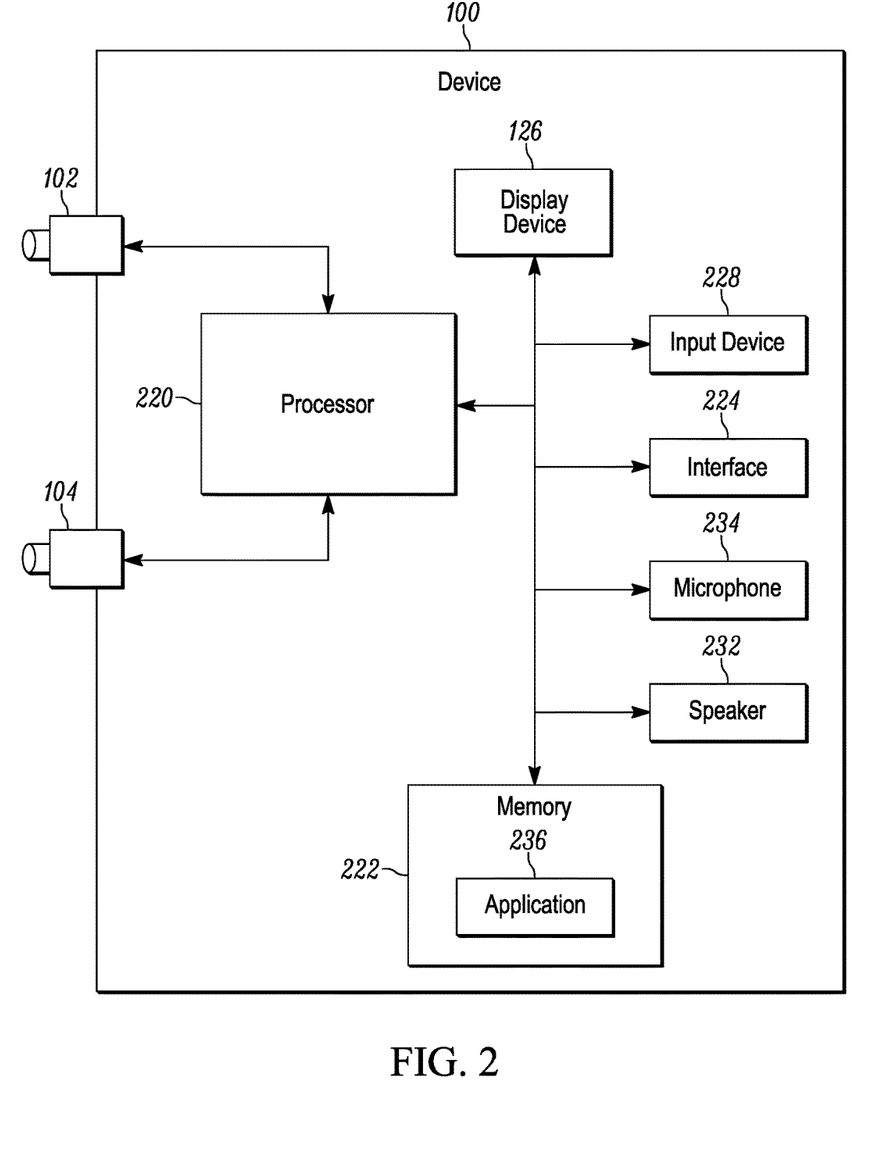
FIG. 2 depicts a block diagram of an example device, in accordance with some implementations.

FIG. 1 depicts an example device 100 for dimensioning and barcode scanning, in accordance with some implementations. As described herein, the barcode scanning and dimensioning is based on one or more digital images and depth data. FIG. 2 depicts a block diagram of device 100 of FIG. 1, in accordance with some implementations.

Referring to FIG. 1 and FIG. 2, in various implementations, device 100 may be a personal digital assistant (PDA), tablet, or any suitable handheld device. As shown, a device 100 includes a two-dimensional (2D) camera device 102, a three-dimensional (3D) camera device 104 which may be referred to as a depth sensing device 104, and at least one processor 220 which may referred to as a dimensioning processor and/or a barcode reading processor 220. In this example implementation, 2D camera device 102 is built into device 100. As such, 2D camera device 102 is shown as dotted lines. As shown, 2D camera device 102 includes a 2D camera lens 106, and 3D camera device 104 includes a 3D camera lens 108. As indicated herein, 2D camera device 102 may include a barcode imager. In an embodiment, the 2D camera device may be a red-green-blue (RGB) camera. Also, 3D camera device may be an infrared camera device. In some implementations, 3D camera device may also include a laser pattern emitter 110.

In various implementations, processor 220 is configured to: acquire a 2D preview image of an object obtained from the 2D camera device; process the 2D preview image to determine one or more dark areas (e.g., image areas below a predetermined brightness threshold and/or image areas that have a predetermined dark color, including those image areas that are black or substantially black) and to determine a location of a code on the object; and acquire a 3D image of the object based on one or more of the one or more dark areas, where the 3D image is obtained from the 3D camera device. The processor may be further configured to process the 3D image to determine depth data and to determine dimensions of the object. The processor may also be configured to acquire a 2D data capture image of the object based on the depth data in the processed 3D image, where the 2D data capture image captures the code, and where the 2D data capture image is obtained from the 2D camera device. The processor may also be configured to read the code based on the 2D data capture image.

In various implementations, 2D camera device 102 may be interchangeably referred to as camera 102, and 3D camera device 104 may be interchangeably referred to as depth sensing device 104. Also, processor 220 may be interchangeably referred to as dimensioning processor and/or barcode reading processor 220.

Referring still to FIG. 2, device 100 further includes a memory 222, a communication interface 224 (interchangeably referred to as interface 224), a display device 126, at least one input device 228, a speaker 232, and a microphone 234. Device 100, and its components, will now be described in further detail. Device 100 may include a mobile or otherwise portable computing device having a graphics processing unit (GPU), a graphics processing device, a graphics processing engine, a video processing device, and the like. Device 100 acquires images and depth data to dimension objects in a field of view of camera 102 and depth sensing device 104. In an embodiment, device 100 includes a device with specialized functions, for example, warehouse, retail, or healthcare functionality, including but not limited to tracking or otherwise processing of inventory, shipping parcels, retail items, healthcare supplies, and the like. In various other embodiments, the device 100 may take various form factors, such that of a mobile computing device, tablet, laptop, or desktop computing device, a PDA, a smartphone, an internet-enabled appliance, an electronic camera and the like. Other suitable devices are within the scope of present implementations.

The device 100 may further include one or more of a radio frequency identification (RFID) and/or a near field communication (NFC) reader, a laser-based barcode scanner, one or more handles that may be separate from or form part of the display 126, as well as a trigger for triggering one or more of the cameras 102, 104, laser-based scanner, RFID, an NFC reader, or another data acquisition device. In one embodiment, the trigger is a hardware trigger switch built into the device 100, for example integrated into a handle or disposed elsewhere on the housing of the device 100. Alternatively or in addition, the trigger may be a graphical user interface component, such as a button displayed on a touch screen of a display device 126.

In various implementations, camera 102 may include a digital camera, RGB digital camera, and the like, configured to acquire digital images, including, but not limited to, images in a video stream. While details of camera 102 are not depicted, it is assumed that camera 102 includes components for acquiring digital images including, but not limited to, respective charge coupled devices (CCD) and the like, as well as respective lenses, respective focusing devices (including, but not limited to voice coils and the like), etc. Hence, data from camera 102 generally includes two-dimensional data, and specifically a 2D array of values, which may include an array of 2D color coordinates and/or brightness coordinates. Depth sensing device 104 may include one or more of a time-of-flight (TOF) camera, an active stereo vision camera (which may project its own light, including but not limited to infrared light), and a passive stereo vision camera (which relies on ambient light). In various implementations, these different technologies may be applied for different working conditions and different working ranges. For example, in direct sunlight, passive sterio vision systems are preferred. For a long working range, TOF is preferred, and for indoor applications with small boxes, structured light (e.g., active stereo vision) is preferred. However, other depth sensing devices are within the scope of present implementations. In some implementations, depth sensing device 104 may include a pair of cameras, which may include camera 102, that form a stereo vision camera. When depth sensing device 104 includes a structured light camera, depth sensing device 104 may include a device configured to project structured light and a camera to capture images of physical objects illuminated by the structured light. When depth sensing device 104 includes a TOF camera, depth sensing device 104 includes components for providing such functionality.

Depth sensing device 104 is configured to sense depth across a field of view. In particular, depth data from depth sensing device 104 could be processed to produce a three-dimensional map of the field of view of depth sensing device 104. Hence, data from depth sensing device 104 may be referred to as three-dimensional data and may include a two-dimensional array of depth coordinates (e.g., each element in the two-dimensional array is associated with a corresponding depth).

The depth data from depth sensing device 104 generally represents a distance from the depth sensing device 104 to portions of objects in the field of view of depth sensing device 104. In some implementations the depth data may include, and/or be converted to, "real world coordinates" which may include three-dimensional coordinates in a selected reference frame and/or a given reference frame. In some implementation such a reference frame may be relative to depth sensing device 104 (e.g., depth sensing device 104 may include an origin of the reference frame). In other implementations, such a reference frame may be relative to a fixed coordinate, for example a point in a warehouse and/or a geographical coordinate determined using a global positioning system (GPS) device. In the latter implementations, device 100 may include a GPS device, and coordinates of depth data from depth sensing device 104 may be determined relative to an origin defined with respect to GPS data.

As depicted in FIG. 1, external components of each of camera 102 and depth sensing device 104 may be located on a rear side of device 100, and display device 126 may be located on a front side of device 100, such that digital images and depth data may be captured at a rear side of device 100. Put another way, a field of view of each of camera 102 and depth sensing device 104 may overlap at a particular point along an axis perpendicular to the plane of a rear side of device 100.

Furthermore, as also depicted in FIG. 1, image capturing components and/or data capturing components of camera 102 and depth sensing device 104, such as lenses and the like, may be separated by a distance such that images from camera 102 and depth data from depth sensing device 104 generally image and/or sense depth across a similar field of view. In other words, respective fields of view of camera 102 and depth sensing device 104 generally overlap substantially. In some implementations, lenses, and the like, of each of camera 102 and depth sensing device 104 are as close together as possible. This is both to reduce parallax there between and to ensure that depth data may be captured for an object imaged by camera 102.

Note that the locations of each of camera 102 and depth sensing device 104 in each of FIG. 1 and FIG. 2 are merely schematic and do not necessarily represent actual relative positions of each of camera 102 and depth sensing device 104. For example, camera 102 and depth sensing device 104 may be located anywhere on device 100 (presuming that their fields of view at least partially overlap such that physical objects in their respective fields of view may be both imaged by camera 102 and sensed by depth sensing device 104).

In some implementations, camera 102 and depth sensing device 104 may occupy the same point in space such that their respective fields of view would be identical. In some implementations, camera 102 may include an RGB camera (e.g., camera 102) and a TOF camera (e.g., depth sensing device 104.). The particular configuration may vary, and will depend on the particular implementation. Furthermore, such a configuration allows for preprocessing of digital images and depth data to align corresponding areas and/or pixels, to minimize "pixel shadowing" and "dark regions." For example, due to parallax, and in some cases of arrangements of object in their fields of view, regions that are visible to camera 102 are not visible to depth sensing device 104, or vice versa. This may cause an absence of image data in regions for which there is depth data and/or an absence of depth data in regions for which there is image data. When such regions are large, they may distort data being processed using techniques described herein, so the closest possible co-location of camera 102 and depth sensing device 104 is preferred.

Processor 220 may include a processor and/or a plurality of processors, including but not limited to one or more central processors (CPUs) and/or one or more processing units and/or one or more graphic processing units (GPUs); either way, processor 220 includes a hardware element and/or a hardware processor. Indeed, in some implementations, processor 220 may include an application-specific integrated circuit (ASIC) and/or a field-programmable gate array (FPGA) specifically configured to implement the functionality of device 100. Hence, device 100 is preferably not a generic computing device, but a device specially configured to implement specific functionality including dimensioning using digital images and depth data, and barcode scanning and reading, as described in further detail below. For example, device 100 and/or processor 220 may specifically include an engine configured to dimension objects and read barcodes in a field of view of camera 102 and depth sensing device 104 using digital images and depth data.

Memory 222 may include a non-volatile storage unit (e.g., erasable electronic programmable read only memory (EEPROM), flash memory, etc.) and a volatile storage unit (e.g., random access memory (RAM)). Programming instructions that implement the functional teachings of device 100 as described herein are typically maintained, persistently, in memory 222 and used by processor 220 which makes appropriate utilization of volatile storage during the execution of such programming instructions. Those skilled in the art recognize that memory 222 is an example of computer readable media that may store programming instructions executable on processor 220. Furthermore, memory 222 is also an example of a memory unit and/or memory module and/or a non-volatile memory.

In particular, in some implementations, memory 222 may store an application 236 that, when executed by processor 220, enables processor 220 to acquire a 2D preview image of an object, where the 2D preview image is obtained from a 2D camera device. Application 236 also enables processor

220 to process the 2D preview image to determine one or more dark areas and to determine a location of a code on the object. Application 236 also enables processor 220 to acquire a 3D image of the object based on one or more of the one or more dark areas, where the 3D image is obtained from a 3D camera device. Application 236 also enables processor 220 to process the 3D image to determine depth data and to determine dimensions of the object. Application 236 also enables processor 220 to acquire a 2D data capture image of the object based on the depth data in the processed 3D image, where the 2D data capture image captures the code, and where the 2D data capture image is obtained from the 2D camera device. Application 236 also enables processor 220 to read the code based on the 2D data capture image. In one embodiment, processor 220 interfaces with specially configured firmware instead of or in addition to the application 236 in order to execute the foregoing functionality.

Processor 220 may be configured to control display device 126 to one or more of: render a digital image from camera 102, identify an object in the digital image, display the decoded barcode, and render the dimensions of the object, presuming such dimensions have been determined, as described in further detail below.

Device 100 generally includes at least one input device 228 configured to receive input data, and may include any suitable combination of input devices, including but not limited to a keyboard, a keypad, a pointing device, a mouse, a track wheel, a trackball, a touchpad, a touch screen (e.g., integrated with display device 126), and the like. Other suitable input devices are within the scope of present implementations. In some implementations, one or more of input device 228 and display device 126 may be external to device 100, with processor 220 in communication with any external components via a suitable connection and/or link.

As depicted, device 100 further includes an optional speaker 232 or speakers and an optional microphone 234 (either of which may alternatively be external to device 100). Speaker 232 includes any suitable speaker for converting audio data to sound to provide one or more of audible alerts, audible communications from remote communication devices, and the like. Microphone 234 includes any suitable microphone for receiving sound and converting to audio data. Speaker 232 and microphone 234 may be used in combination to implement telephone and/or communication functions at device 100.

As depicted, processor 220 also connects to optional interface 224, which may be implemented as one or more radios and/or connectors and/or network adaptors, configured to wirelessly communicate with one or more communication networks (not depicted). It will be appreciated that interface 224 is configured to correspond with network architecture that is used to implement one or more communication links to the one or more communication networks, including but not limited to any suitable combination of universal serial bus (USB) cables, serial cables, wireless links, cell-phone links, cellular network links (including but not limited to 2G, 2.5G, 3G, 4G+ such as universal mobile telecommunications system (UMTS), global system for mobile communications (GSM), code division multiple access (CDMA), frequency division duplexing (FDD), long term evolution (LTE), time division duplexing (TDD), TDD-long term evolution (TDD-LTE), time division synchronous code division multiple access (TD-SCDMA) and the like, wireless data, Bluetooth™ links, near field communication (NFC) links, wireless local area network (WLAN) links, WiFi links, WiMax links, packet based links, the Internet, analog networks, public switched telephone network (PSTN), access points, and the like, and/or a combination.

While not depicted, device 100 further includes a power supply, including, but not limited to, a battery, a power pack and the like, and/or a connection to a mains power supply and/or a power adaptor (e.g., an alternating current to direct current (AC-to-DC) adaptor). In general the power supply powers components of device 100.

Hence, it should be understood that in general a wide variety of configurations for device 100 are contemplated.

Figure 3:
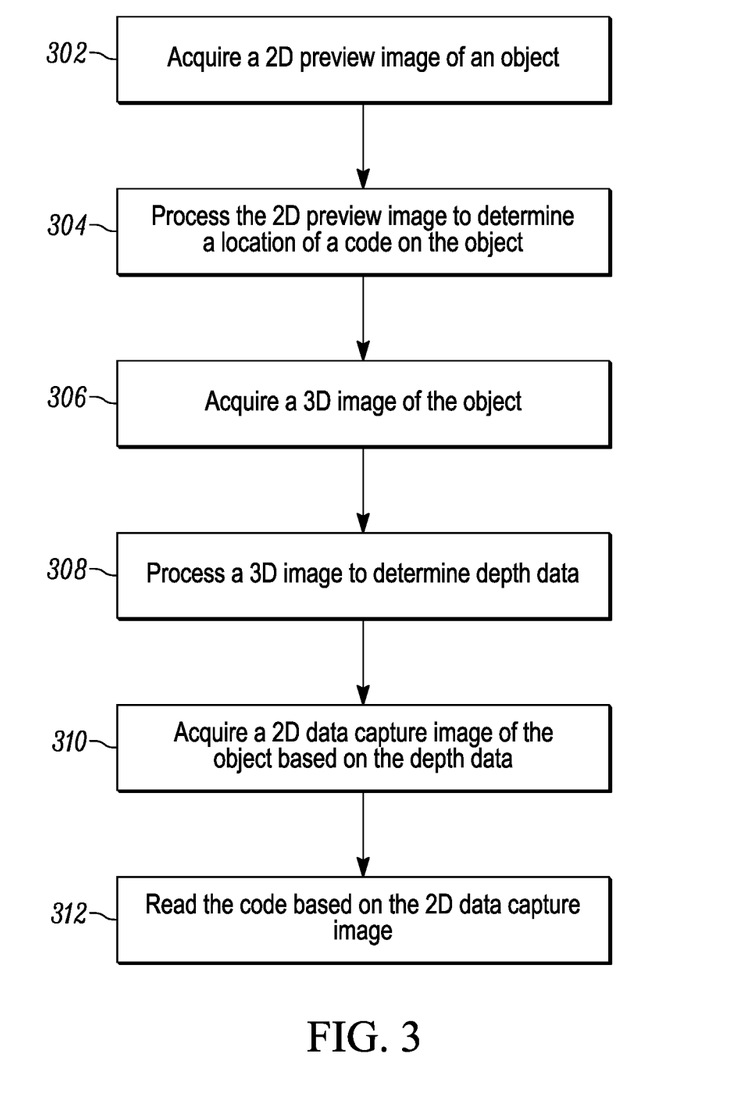
FIG. 3 depicts a flowchart of an example method for barcode scanning, in accordance with some implementations.

Attention is now directed to FIG. 3, which depicts a block diagram of a flowchart of a method for scanning and reading barcodes using digital images and depth data, according to non-limiting implementations. In order to assist in the explanation of the method and other methods described herein, it will be assumed that the method is performed using device 100, specifically by processor 220, and when processor 220 processes instructions stored at memory 222 (e.g., application 236). Indeed, device 100 as shown in FIGS. 1 and 2 may have other configurations. Furthermore, the following discussion of the method will lead to a further understanding of device 100, and its various components. However, it is to be understood that device 100 and/or the methods described herein may be varied, and need not work exactly as discussed herein in conjunction with each other, and that such variations are within the scope of present implementations.

Regardless, it is to be emphasized, that the methods described herein need not be performed in the exact sequence as shown, unless otherwise indicated. Likewise, various blocks may be performed sequentially and/or in parallel. Hence the elements of the methods described herein are referred to herein as "blocks" rather than "steps." It is also to be understood, however, that method may be implemented on variations of device 100 as well.

FIG. 3 depicts a flowchart of an example method for barcode scanning, in accordance with some implementations. As described herein, the barcode scanning is based on one or more digital images and depth data. Referring to FIGS. 2 and 3, a method is initiated at block 302, where processor 220 acquires a two-dimensional (2D) preview image of an object. In various implementations, the 2D preview image is obtained from a 2D camera device. At block 304, processor 220 processes the 2D preview image to determine a location of a code, such as a barcode, on the object. At block 306, processor 220 acquires a three-dimensional (3D) image of the object. In various implementations, the 3D image is obtained from a 3D camera device.

At block 308, processor 220 processes the 3D image to determine depth data. In some implementations, the processing of the 3D image may include determining pixels in the 3D image that correspond to the pixels in the 2D preview image associated with the barcode. In some implementations, the processing of the 3D image may include determining depth values of the corresponding pixels in the 3D image. In various implementations, the depth values informs 2D camera 102 what the distance is between an object and 2D camera 102, which helps 2D camera 102 to better focus on the object.

At block 310, processor 220 acquires a 2D data capture image of the object based on the depth data in the processed 3D image. In various implementations, the 2D data capture image captures the code, and the 2D data capture image is obtained from the 2D camera device.

In some implementations, processor 220 acquires a 2D data capture image of the object based on the depth data in the processed 3D image in that processor 220 focuses the lens of the 2D camera device on the code based on the depth data in the processed 3D image, which may be used to determine the focus length for the 2D camera device. Processor 220 then acquires the 2D data capture image after focusing the lens of the 2D camera.

In various implementations, processor 220 provides an indicator to a user, where the indicator guides the user to position the 2D camera device to achieve optimal focus relative to the object based on the depth data in the processed 3D image. For example, in some implementations, the indicator may guide the user to optimally position the 2D camera device relative to the object (e.g., closer or farther away) when acquiring the data capture 2D preview image.

In some implementations, processor 220 adjusts the 2D camera resolution of the barcode based on the depth data in the processed 3D image.

In various implementations, processor 220 crops the image of the code from the 2D camera when the depth data in the processed 3D image exceeds a predetermined depth threshold. In other implementations, when the depth data indicates that the barcode depth is less than the threshold, processor 220 decreases resolution of the 2D camera by binning the depth values. In one non-limiting example, from the 3D depth data, the processor knows that the object (e.g., a box) is close and shrinks 2D RGB image from 3264*2448 to 640*480 resolution. The processor does this because 640*480 resolution is enough for barcode decoding. Decreased resolution requires less computation, which speeds up processing. In another non-limiting example, from the 3D depth data, the processor knows the box is far and that the barcode is too small to read in the 640*480 2D RGB image. This may result in failed barcode decoding. Therefore, the processor adjusts (e.g., increases) the 2D image resolution to the original 3260*2448 resolution.

At block 312, processor 220 reads the code based on the 2D data capture image. In some implementations, the code may be a barcode. In some implementations, the code may be a one dimensional barcode. In other implementations the code may be a two dimensional barcode such as a QR code. In yet another embodiment, the processor 220 uses the 3D image to locate the target object and then search for and decode a barcode on the target object based on the 2D data capture image subsequently acquired by the 2D camera device.

Figure 4:
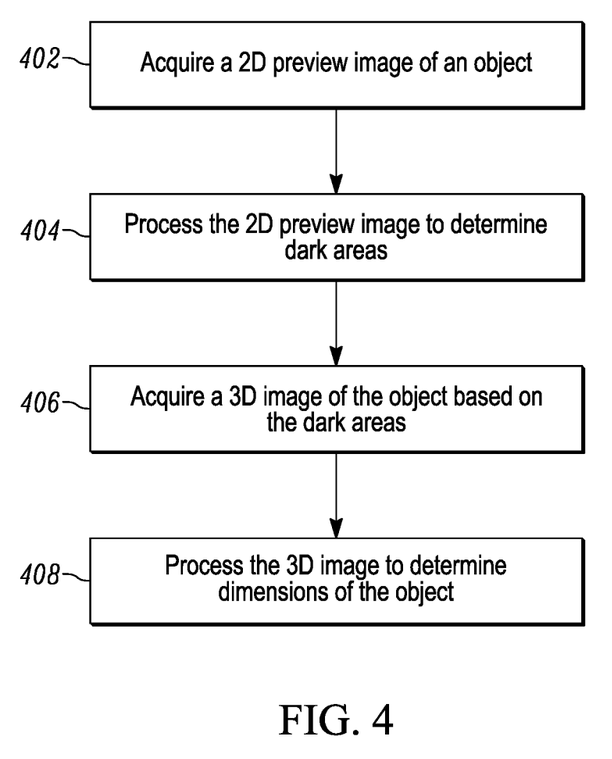
FIG. 4 depicts a flowchart of an example method for dimensioning, in accordance with some implementations.

FIG. 4 depicts a flowchart of an example method for dimensioning, in accordance with some implementations. As described herein, the dimensioning is based on one or more digital images and depth data. Referring to both FIGS. 2 and 4, a method is initiated at block 402, where processor 220 acquires a two-dimensional (2D) preview image of an object. As indicated above, the 2D preview image is obtained from a 2D camera device.

At block 404, processor 220 processes the 2D preview image to determine one or more dark areas.

At block 406, processor 220 acquires a three-dimensional (3D) image of the object based on the one or more dark areas in the processed 2D preview image. In some implementations, the acquiring of the 3D image is based on the acquiring of the 2D preview image in that the acquiring of the 3D image and the acquiring of the 2D preview image are performed together.

As indicated above, the 3D image is obtained from a 3D camera device. As indicated above, the 3D camera device is an infrared camera device.

In various implementations, processor 220 may adjust the 3D image in response to dark areas. For example, in some implementations, processor 220 may adjust the exposure time of the 3D image, the gain of the 3D image, or a combination thereof based on the one or more dark areas in the processed 2D preview image. In some implementations, exposure values may be different for the different dark areas. To explain further, in some implementations utilizing a passive stereo vision system, for example, sufficient light is required to enable 3D reconstruction. Therefore, the processor, by incorporating 2D camera input, determines if the light is sufficient at the target box. If the ambient light is not sufficient, the target is dark, or black, and the passive stereo vision system may then fail to provide 3D data. In this case, the processor adjusts the image signal processing (ISP) of the 3D camera to adjust the exposure time and/or gain, to achieve sufficient brightness from the target. In some implementations, using a structured light system, such as structured IR, dark materials may be black and absorb most visible light and IR light. In a 2D camera, this kind of material is dark or black. In a 3D structured light system, because most of the IR is absorbed, less IR signal is reflected and received by the 3D sensor from the dark colored areas. Consequently, this type of material is dark in both the 2D image and in the 3D depth map image. In both of these implementations the processor may adjust the exposure and/or gain of the 3D camera device to enhance the acquisition of 3D image data.

In some implementations, to process the 3D image, processor 220 may identify one or more surfaces of the object. Processor 220 then determines a region of interest based on the one or more surfaces. In some implementations, the region of interest (ROI) may be determined by the user using a crosshair in the preview image, for example. The user may adjust the sensor position to locate the cross hair on one of the box surfaces. This may help enable the processor to locate the target. As indicated above, processor 220 may then adjust the exposure time of the 3D image, the gain of the 3D image, or combination thereof based on the processed 2D preview image. In some implementations, processor 220 may then determine dimensions of the object based on the one or more surfaces of the object.

At block 408, processor 220 processes the 3D image to determine dimensions of the object.

In some implementations, processor 220 may cause the dimensions of the object to be displayed on a display device. In some implementations, processor 220 may cause the 2D data capture image of the object to be displayed on the display device along with the determined dimensions.

Figure 5:
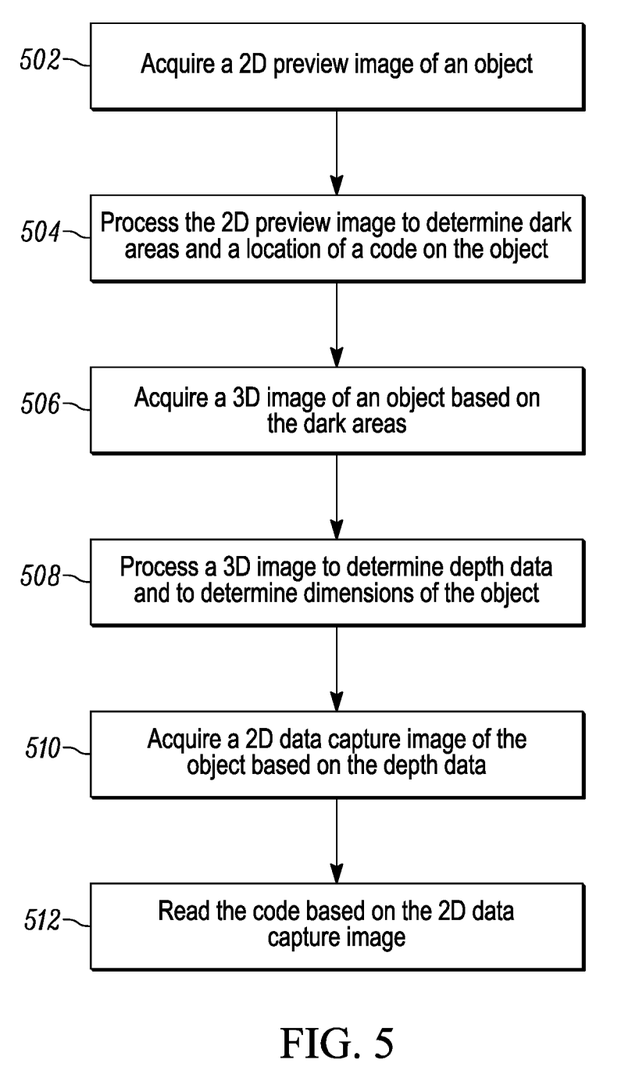
FIG. 5 depicts a flowchart of an example method for barcode scanning and dimensioning, in accordance with some implementations.

FIG. 5 depicts a flowchart of an example method for barcode scanning and dimensioning, in accordance with some implementations. As described herein, the barcode scanning and dimensioning are based on one or more digital images and depth data. Referring to both FIGS. 2 and 5, at block 502, processor 220 acquires a 2D preview image of an object. As indicated above, the 2D preview image is obtained from a 2D camera device.

At block 504, processor 220 processes the 2D preview image to determine one or more dark areas and a location of a code on the object.

At block 506, processor 220 acquires a 3D image of the object based on one or more of the one or more dark areas. As indicated above, the 3D image is obtained from a 3D camera device.

At block 508, processor 220 processes the 3D image to determine depth data and to determine dimensions of the object.

At block 510, processor 220 acquires a 2D data capture image of the object based on the depth data in the processed 3D image. In various implementations, utilizing the 3D location and dimensions of the object (e.g., a box), boundaries are established for searching for the barcode within those boundaries. In various implementations, the 2D data capture image captures the code, and, as indicated above, the 2D data capture image is obtained from the 2D camera device.

At block 512, processor 220 reads the code based on the 2D data capture image.

Alternatively, and/or in addition, processor 220 may store, at memory 222, one or more of the digital image and the dimensions of the object. Alternatively, and/or in addition, processor 220 may transmit, using interface 224, one or more of the digital image and the dimensions of the object, for example to an external device and/or a remote device. Such transmission of one or more of the digital image and the dimensions of the object may occur in conjunction with cloud-based warehousing, shipping, inventory, retail, and/or healthcare applications and/or other cloud-based functionality.

In some embodiments, measuring of object size, such as box size, and decoding a barcode on the object, can be accomplished in parallel and substantially simultaneously using the 2D camera and 3D camera data by way of the methods described herein.

Figure 6:
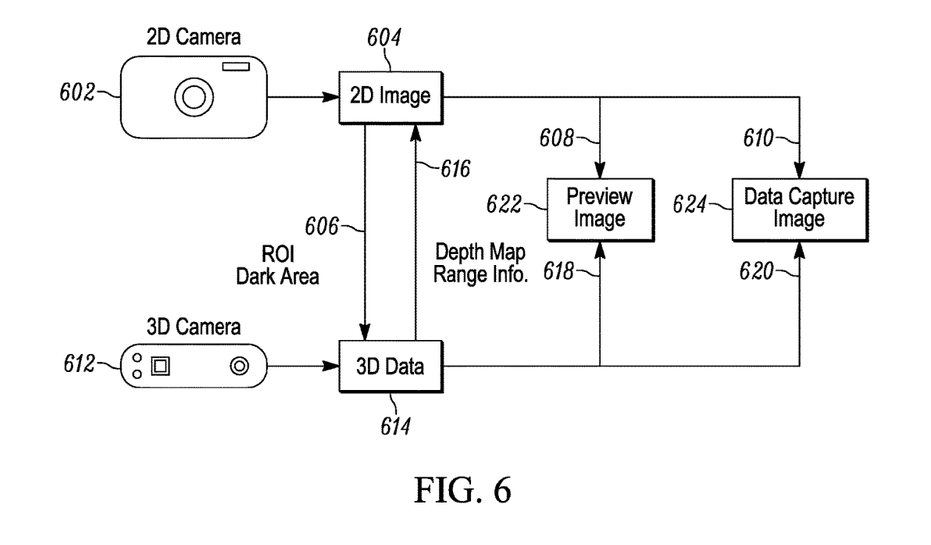
FIG. 6 depicts a block diagram of an example workflow for barcode scanning and dimensioning, in accordance with some implementations.

FIG. 6 depicts a block diagram of an example workflow for barcode scanning and dimensioning, in accordance with some implementations. As described herein, the barcode scanning and dimensioning are based on one or more digital images and depth data. As shown, a 2D camera 602 provides a 2D image 604. Flow resulting from 2D image 604 is represented by arrows 606, 608, and 610. A 3D camera 612 provides 3D data 614. Flow resulting from 3D data 614 is represented by arrows 616, 618, and 620. Arrow 606 indicates that 2D image 604 yields information regarding dark areas within a region of interest (ROI) of 2D image 604. As shown, in various implementations, the information regarding dark areas is combined with 3D data 614. Arrow 616 indicates that 3D data 614 yields a depth map and range information with respect to an object in the field of view. As shown, in various implementations, the depth map and range information are combined with information associated with 2D image 604. In various implementations, a depth map includes a 2D image, where each pixel in the 2D image represents the range from the sensor to this particular point on the object.

In various implementations, preview image 622 may be obtained using input from both 2D image 604 and 3D data 614. This is indicated by arrows 608 (2D) and 618 (3D), respectively. In some implementations, data from both the 2D and 3D input may be overlaid or combined to provide the guidance for the user. For example, the guidance may direct the user to move device 100 (e.g., the 2D and 3D cameras) closer or farther away from the object. In some implementations, corresponding pixels in the 3D image are correlated with the pixels in the 2D image, and the depth values are read. In some implementations, the 3D camera provides depth of range information to the object. In some implementations, the barcode decoding range, e.g., range of focusing, is between 0.5 meters and 5 meters. In some implementations, the depth information is used to provide an error message to the user if the object is out of range for barcode decoding via the 2D imager. In some implementations, "not a number" (NAN) areas, which may be caused by low reflectivity, overexposure, or being out of range, are overlapped in the 2D and 3D image data, which may be displayed as image preview," and utilized to guide the user to avoid or to adjust the exposure and gain selection accordingly in the subsequent capture image. In various implementations, 3D data 614 is processed to yield various types of information. For example, in some implementations, the 3D data may be processed to obtain range limits for the 2D camera. The range limits may in turn be used to optimize focus and provide auto focus capability. In general, 2D color images are more intuitive for aiming purposes. In some implementations, aiming is accomplished using crosshairs to select the region of interest and to select the object of interest, which may include the barcode.

In various implementations, data capture image 624 may be obtained using input from both 2D image 604 and 3D data 614, which may be processed as outlined above to determine depth data, range information, and dimensions of the object, etc. This is indicated by arrows 610 (2D) and 620 (3D). In some implementations, the 2D capture image, obtained from the 2D camera device, and which captures the code or barcode, is based on the depth data in the processed 3D image. The combination of 2D and 3D data is leveraged to achieve higher performance. By way of example, the 2D camera lens may be focused to the barcode according to the depth data from the 3D image. Additionally, based on the depth data, if the depth is less than threshold, i.e. the barcode is close enough, throughput may be increased by decreasing resolution using binning before sending it to the decoder for decoding. Correspondingly, if the depth is more than threshold, the resolution may be increased by cropping the barcode before providing the data to the decoder for decoding.

Figure 7:
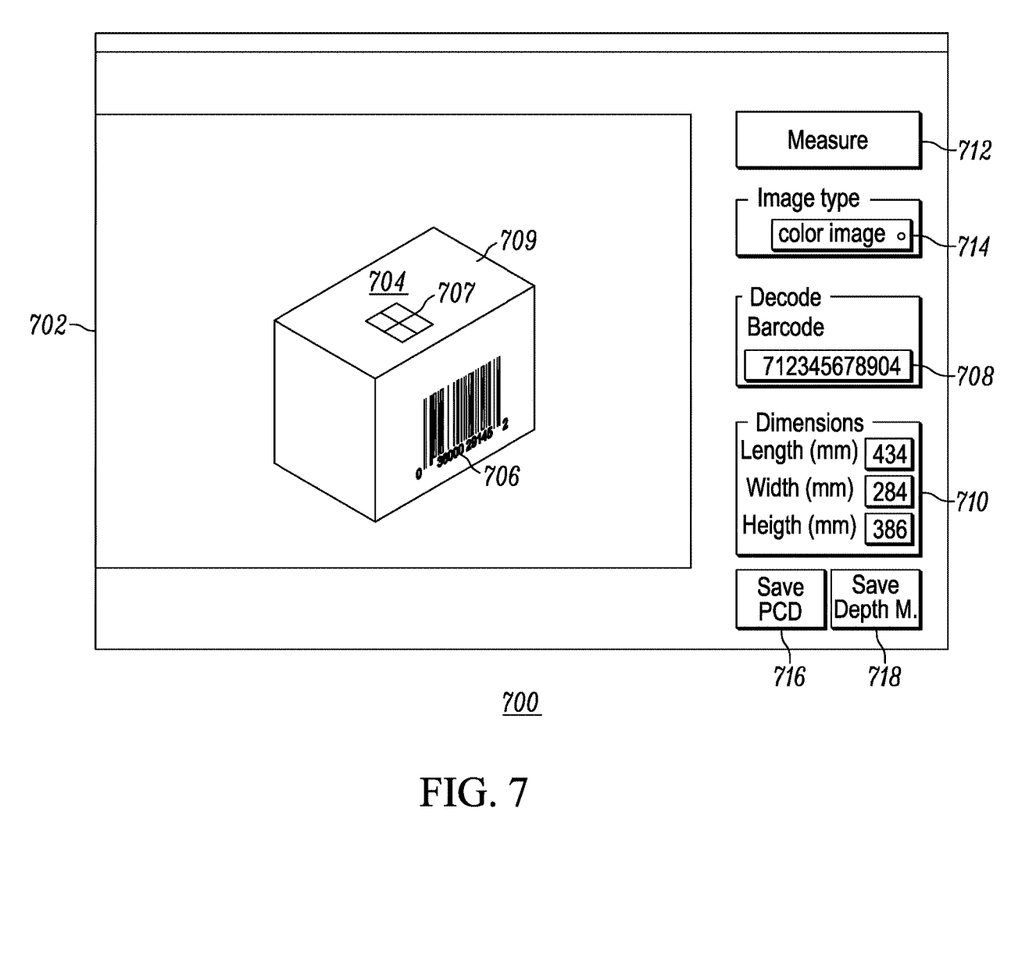
FIG. 7 depicts an example user interface rendering a digital image of a physical object as well as dimensions thereof and a barcode readout, in accordance with some implementations.

FIG. 7 depicts an example user interface 700 rendering a digital image of a physical object as well as dimensions thereof and a barcode readout, in accordance with some implementations. User interface 700 shows a 2D image 702 of the field of view encompassing an object 704, which may have barcode 706 thereon. Crosshairs 707 are indicated on a top surface 709 of object 704. In some implementations, crosshairs 707 indicate the user's selection of a region of interest (ROI). In some implementatins, the ROI may include only the selected portion or surface of object 704. Once the ROI is selected, the system may then determine the remainder of object 704 (e.g., the entire object 704). Also shown is a barcode reading 708 and dimensions 710. In various implementations, dimensions may include length, width, and height.

In some implementations, the system may perform the barcode scanning and dimensioning, thereby providing barcode 706 and dimensions, in response to a user selecting a measure button 712. In some implementations, user interface 700 may provide a drop-down menu 714 to enable the user to select the type of image. For example, drop-down menu 714 when selected may show options such as "color image," "black-and-white image," "depth map," etc., depending on the particular implementation. In some implementations, user interface 700 may include a button 716 to save 2D image 702 and a button 718 to save an associated depth map. Note that while a depth map rendering is not shown, as described in various implementations herein, processor 220 still generates a depth map, which may optionally be displayed via the user interface 700 and/or saved.

Implementations described herein may utilize various known dimensioning techniques for dimensioning. For example, in some implementations, a dimensioning technique may by used that computes dimensions of an object based on the respective depth data and the respective associations of shapes belonging to an object identified in the digital image. In some implementations, a dimensioning technique may be used that computes dimensions of an object based on a 3D point cloud data, obtained from the 3D camera, associated with an object identified in the digital image.

In the foregoing specification, specific implementations have been described. However, one of ordinary skill in the art appreciates that various modifications and changes can be made without departing from the scope of the specification as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The twins "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The tennis "substantially," "essentially," "approximately," "about," or any other version thereof, are defined as being close to as understood by one of ordinary skill in the art, and in one non-limiting implementation the term is defined to be within 10%, in another implementation within 5%, in another implementation within 1% and in another implementation within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some implementations may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an implementation can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a compact disc read-only memory (CD-ROM), an optical storage device, a magnetic storage device, a read only memory (ROM), a programmable read only memory (PROM), an erasable programmable read only memory (EPROM), an electrically erasable programmable read only memory (EEPROM) and a flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various implementations for the purpose of streamlining the disclosure. This method of disclosure is not to be interpreted as reflecting an intention that the claimed implementations require more features than are expressly recited in each claim. Rather, as the following claims reflect, inventive subject matter lies in less than all features of a single disclosed implementation. Thus the following claims are hereby incorporated into the Detailed Description, with each claim standing on its own as a separately claimed subject matter.

We claim:

1. A method comprising:
   acquiring a two-dimensional (2D) preview image of an object, wherein the 2D preview image is obtained from a 2D camera device;
   processing the 2D preview image to determine a location of a code on the object;
   acquiring a three-dimensional (3D) image of the object, wherein the 3D image is obtained from a 3D camera device;
   processing the 3D image to determine depth data associated with the object;
   acquiring a 2D data capture image of the object based on the depth data in the processed 3D image, wherein the 2D data capture image captures the code, and wherein the 2D data capture image is obtained from the 2D camera device; and
   reading the code based on the 2D data capture image.

2. The method of claim 1, wherein the 3D camera device is an infrared camera device.

3. The method of claim 1, further comprising focusing a lens of the 2D camera device on the code based on the depth data.

4. The method of claim 1, further comprising providing an indicator to a user, wherein the indicator guides the user to optimally position the 2D camera device relative to the object based on the depth data.

5. The method of claim 1, further comprising adjusting a resolution of the code based on the depth data in the processed 3D image.

6. The method of claim 1, wherein the code is a barcode.

7. The method of claim 1, further comprising cropping an image of the code when the depth data in the processed 3D image exceeds a predetermined depth threshold.

8. A system comprising:
a two-dimensional (2D) camera device;
a three-dimensional (3D) camera device;
one or more processors; and
data storage containing instructions executable by the one or more processors for causing the system to perform operations comprising:
acquiring a 2D preview image of an object, wherein the 2D preview image is obtained from a 2D camera device;
processing the 2D preview image to determine a location of a code on the object;
acquiring a 3D image of the object, wherein the 3D image is obtained from a 3D camera device;
processing the 3D image to determine depth data associated with the object;
acquiring a 2D data capture image of the object based on the depth data in the processed 3D image, wherein the 2D data capture image captures the code, and wherein the 2D data capture image is obtained from the 2D camera device; and
reading the code based on the 2D data capture image.

9. A method comprising:
acquiring a two-dimensional (2D) preview image of an object, wherein the 2D preview image is obtained from a 2D camera device;
processing the 2D preview image to determine one or more dark areas;
acquiring a three-dimensional (3D) image of the object based on the one or more dark areas in the processed 2D preview image, wherein the 3D image is obtained from a 3D camera device;
adjusting at least one of an exposure time of the 3D image and a gain of the 3D image based on the one or more dark areas in the processed 2D preview image; and
processing the 3D image to determine dimensions of the object.

10. The method of claim 9, wherein the 3D camera device is an infrared camera device.

11. The method of claim 9, further comprising displaying the dimensions of the object on a display device.

12. The method of claim 9, further comprising displaying the 2D preview image of the object on a display device.

13. The method of claim 9, wherein the processing of the 3D image comprises:
identifying one or more surfaces of the object;
determining a region of interest based on the one or more surfaces of the object; and
adjusting at least one of the exposure time of the 3D image and the gain of the 3D image based on the processed 2D preview image.

14. The method of claim 9, wherein the processing of the 3D image comprises:
identifying one or more surfaces of the object; and
determining dimensions of the object based on the one or more surfaces of the object.

15. A system comprising:
a two-dimensional (2D) camera device;
a three-dimensional (3D) camera device;
one or more processors; and
data storage containing instructions executable by the one or more processors for causing the system to perform operations comprising:
acquiring a 2D preview image of an object, wherein the 2D preview image is obtained from a 2D camera device;
processing the 2D preview image to determine one or more dark areas;
acquiring a 3D image of the object based on the one or more dark areas in the processed 2D preview image, wherein the 3D image is obtained from a 3D camera device; and
processing the 3D image to determine dimensions of the object.

16. A method comprising:
acquiring a two-dimensional (2D) preview image of an object, wherein the 2D preview image is obtained from a 2D camera device;
processing the 2D preview image to determine one or more dark areas and to determine a location of a code on the object;
acquiring a three-dimensional (3D) image of the object based on the one or more dark areas, wherein the 3D image is obtained from a 3D camera device;
processing the 3D image to determine depth data and to determine dimensions of the object;
acquiring a 2D data capture image of the object based on the depth data in the processed 3D image, wherein the 2D data capture image captures the code, and wherein the 2D data capture image is obtained from the 2D camera device; and
reading the code based on the 2D data capture image.

17. The method of claim 16, wherein the 3D camera device is an infrared camera device.

18. The method of claim 16, further comprising focusing a lens of the 2D camera device on the code based on the depth data from the 3D image.

19. The method of claim 16, further comprising providing an indicator to a user, wherein the indicator guides the user to optimally position the 2D camera device relative to the object based on the depth data from the 3D image.

* * * * *